(12) United States Patent
Riley et al.

(10) Patent No.: US 7,500,713 B2
(45) Date of Patent: Mar. 10, 2009

(54) INTERLOCKING JOINT FOR A WALL OR DOOR OF A TRAILER

(75) Inventors: Kevin Riley, Lafayette, IN (US);
Francis S. Smidler, Lafayette, IN (US);
Victor Vargas, Lafayette, IN (US);
Robert L. Hancock, Lafayette, IN (US);
Leonard Baker, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 11/672,240

(22) Filed: Feb. 7, 2007

(65) Prior Publication Data
US 2007/0200393 A1 Aug. 30, 2007

Related U.S. Application Data

(60) Provisional application No. 60/776,991, filed on Feb. 27, 2006.

(51) Int. Cl.
*B62D 33/023* (2006.01)
(52) U.S. Cl. .................. 296/191; 296/186.1; 52/582.2; 52/584.1
(58) Field of Classification Search .............. 296/184.1, 296/182.1, 186.1, 191; 52/578, 582.1, 582.2, 52/584.1
See application file for complete search history.

(56) References Cited

U.S. PATENT DOCUMENTS

| 2,394,443 | A | * | 2/1946 | Guignon, Jr. ................. 52/580 |
|---|---|---|---|---|
| 2,990,650 | A | * | 7/1961 | Attwood ...................... 52/468 |
| 3,264,020 | A | * | 8/1966 | De Ridder ................. 52/282.1 |
| 3,303,626 | A | * | 2/1967 | Brigham ................. 52/717.05 |
| 3,574,985 | A | * | 4/1971 | Pierce .......................... 52/463 |
| 3,596,979 | A | * | 8/1971 | Hablitzel et al. .......... 296/181.2 |
| 3,665,666 | A | * | 5/1972 | Delcroix ....................... 52/461 |
| 3,732,659 | A | * | 5/1973 | LaBarge ....................... 52/461 |
| 4,222,606 | A |   | 9/1980 | Brown et al. |
| 4,302,913 | A | * | 12/1981 | Schwartz et al. ............... 52/39 |
| 5,066,066 | A |   | 11/1991 | Yurgevich et al. |
| 5,112,099 | A |   | 5/1992 | Yurgevich et al. |
| 5,588,693 | A |   | 12/1996 | Higginson et al. |
| 5,655,346 | A | * | 8/1997 | Holmes et al. ................ 52/476 |
| 5,678,383 | A | * | 10/1997 | Danielewicz ................ 52/775 |
| 5,700,118 | A |   | 12/1997 | Bennett et al. |
| 5,860,693 | A | * | 1/1999 | Ehrlich ........................ 296/191 |

(Continued)

*Primary Examiner*—Dennis H Pedder
(74) *Attorney, Agent, or Firm*—Trexler, Bushnell, Giangiorgi, Blackstone & Marr, Ltd.

(57) ABSTRACT

A wall or roof of a trailer are formed from a first panel and a second panel which are joined together by a cap and a strip which interengage. The cap includes a base wall and an interlock provided thereon. The base wall abuts the outer surfaces of the panels. The strip includes a base wall and an interlock provided thereon. The strip and cap are separate members. The base wall of the strip abuts the inner surfaces of the panels. The interlock of the strip and the interlock of the cap mate together to form a joint. At least one of the interlocks extend between the panels. The panels may be composite panels or may be from a single sheet or multiple sheets of metal. An adhesive may be provided between the base wall of the cap and the outer surfaces, and an adhesive may be provided between the base wall of the strip and the inner surfaces.

22 Claims, 8 Drawing Sheets

U.S. PATENT DOCUMENTS

| | | |
|---|---|---|
| 5,997,076 A | 12/1999 | Ehrlich |
| 6,220,651 B1 | 4/2001 | Ehrlich |
| 6,389,759 B2 * | 5/2002 | McGrath et al. ........... 52/127.1 |
| 6,412,854 B2 | 7/2002 | Ehrlich |
| 6,588,165 B1 * | 7/2003 | Wright .................... 52/506.05 |
| 6,626,622 B2 | 9/2003 | Zubko |
| 6,652,019 B1 | 11/2003 | Bennett |
| 6,824,341 B2 | 11/2004 | Ehrlich |
| 6,893,075 B2 | 5/2005 | Fenton et al. |
| 6,959,959 B1 | 11/2005 | Roush |
| 7,011,358 B2 | 3/2006 | Graaff et al. |
| 7,152,912 B1 * | 12/2006 | Roush et al. ............. 296/186.1 |
| 2002/0098053 A1 | 7/2002 | Zubko |
| 2002/0101095 A1 | 8/2002 | Gosselin et al. |
| 2003/0080586 A1 | 5/2003 | Ehrlich |
| 2004/0017625 A1 | 1/2004 | Van Drieehuizen et al. |
| 2004/0217631 A1 | 11/2004 | Ehrlich |
| 2005/0225118 A1 | 10/2005 | Oren |
| 2006/0028050 A1 | 2/2006 | Ehrlich |
| 2006/0061136 A1 * | 3/2006 | Pines ...................... 296/186.1 |

* cited by examiner

INTERLOCKING JOINT FOR A WALL OR DOOR OF A TRAILER

This application claims the domestic benefit of U.S. Provisional Application Ser. No. 60/776,991 filed on Feb. 27, 2006, which disclosure is hereby incorporated by reference.

FIELD OF THE INVENTION

This invention is generally directed to a joint for a wall or roof of a semi-trailer.

BACKGROUND OF THE INVENTION

Prior art trailer sidewalls include a plurality of panels, which may be composite panels, which are joined together by joints. In a logistics joint, a portion of the ends of the panels are spaced apart from each other a predetermined distance to define a gap therebetween. Logistics joints have been provided between panels in a variety of ways, see for example, U.S. Pat. No. 5,997,076 which shows several embodiment of a logistics joint. The joints are formed using fasteners, such as rivets.

The use of rivets to form the joints can create snag points for a forklift along the interior sides of the trailer. In addition, the use of rivets may weaken the sidewall construction as a result of the apertures required through the panels. Furthermore, the use of rivets is labor intensive and may cause repetitive motion injuries as a result of rivet insertion. In addition, using rivets in the manufacturing process can create excessive noise during assembly.

SUMMARY OF THE INVENTION

Briefly, the present invention discloses a joint for use in forming a wall or roof of a trailer. The wall or roof are formed from a first panel and a second panel which are joined together by a cap and a strip which interengage. The cap includes a base wall and an interlock provided thereon. The base wall abuts the outer surfaces of the panels. The strip includes a base wall and an interlock provided thereon. The strip and cap are separate members. The base wall of the strip abuts the inner surfaces of the panels. The interlock of the strip and the interlock of the cap mate together to form a joint. At least one of the interlocks extend between the panels.

The panels may be composite panels or may be from a single sheet or multiple sheets of metal. An adhesive may be provided between the base wall of the cap and the outer surfaces of the panels, and an adhesive may be provided between the base wall of the strip and the inner surfaces of the panels.

The interlocks may be interengaging tangs, or a tang which interengages with an aperture.

If composite panels are used, when the interlocks are engaged, a load may be placed on the cap and on the strip to compress the core members of the composite panels. Once the interlocks are mated, the load is removed and the core members expand to ensure a tight fit between the interlocks.

Apertures are preferably provided in the strip to allow attachment of outside devices, such as cargo securement devices, to the strip.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENTS

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 3:
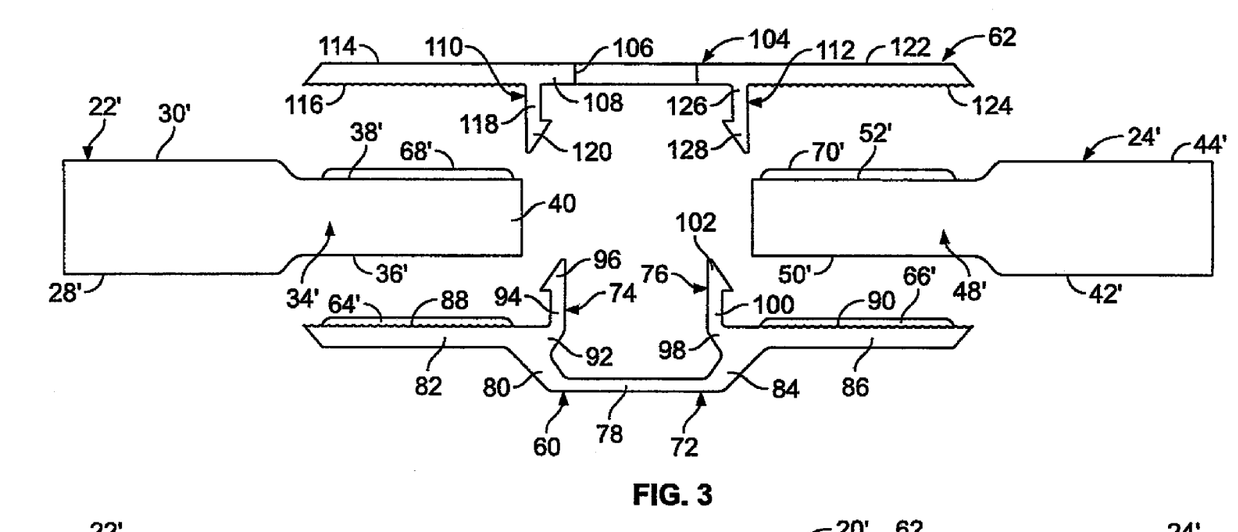
FIG. 3 is an exploded, cross-sectional view of a portion of a component of a trailer showing a second embodiment of a joint which incorporates the features of the present invention.
Figure 4:
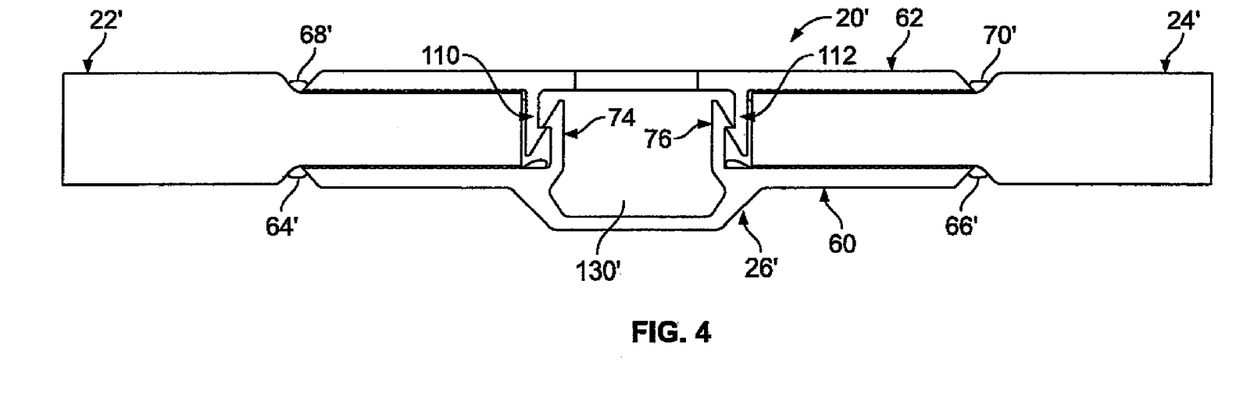
FIG. 4 is a cross-sectional view of the portion of the component shown in FIG. 3, but in an assembled condition.
Figure 5:
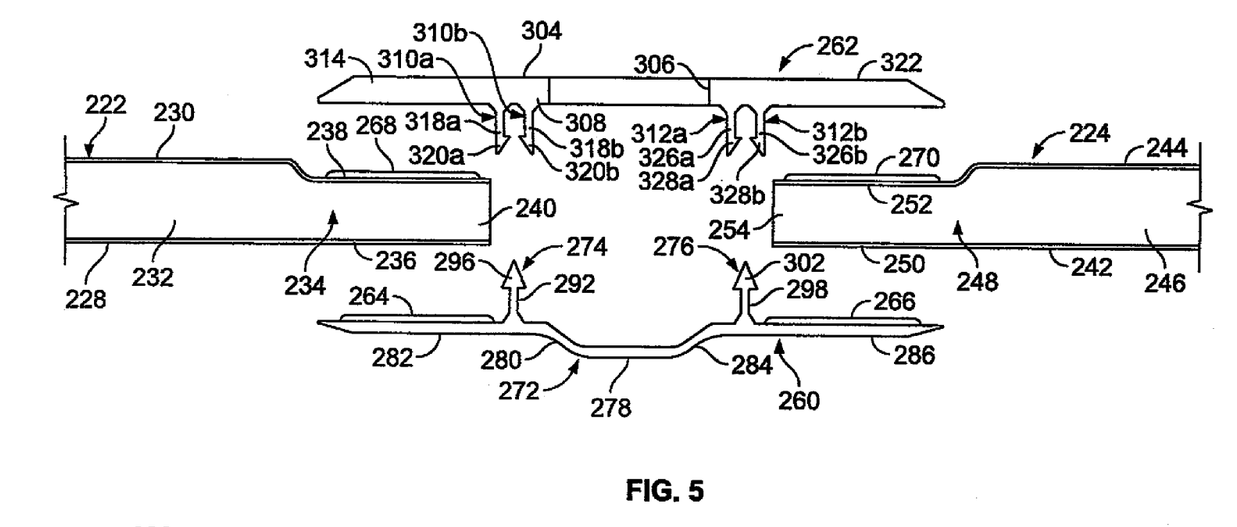
FIG. 5 is an exploded, cross-sectional view of a portion of a component of a trailer showing a third embodiment of a joint which incorporates the features of the present invention.
Figure 6:
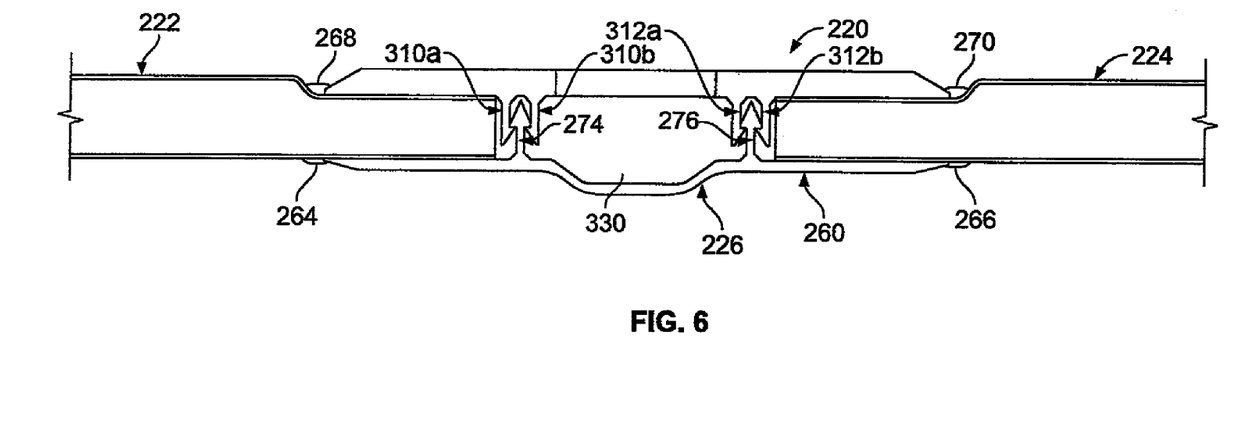
FIG. 6 is a cross-sectional view of the portion of the component shown in FIG. 5, but in an assembled condition.
Figure 7:
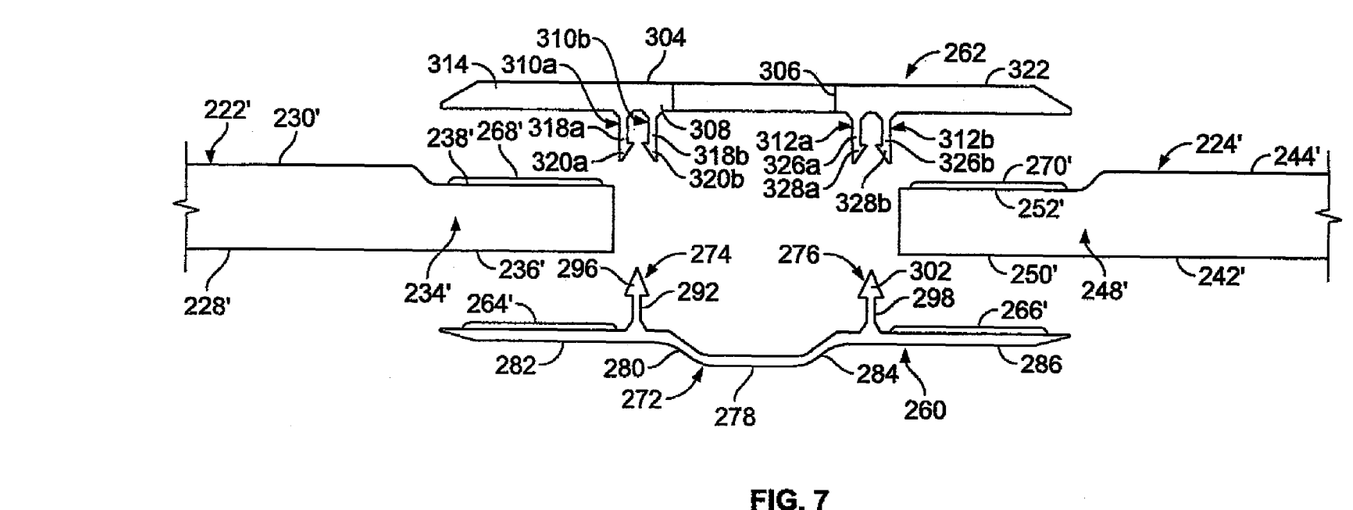
FIG. 7 is an exploded, cross-sectional view of a portion of a component of a trailer showing a fourth embodiment of a joint which incorporates the features of the present invention.
Figure 8:
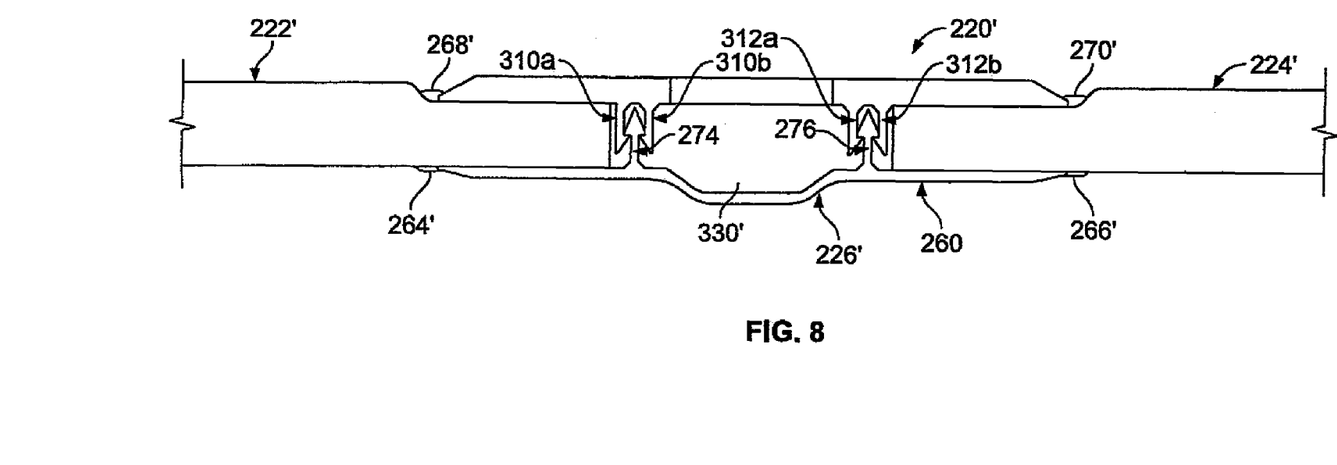
FIG. 8 is a cross-sectional view of the portion of the component shown in FIG. 7, but in an assembled condition.
Figure 9:
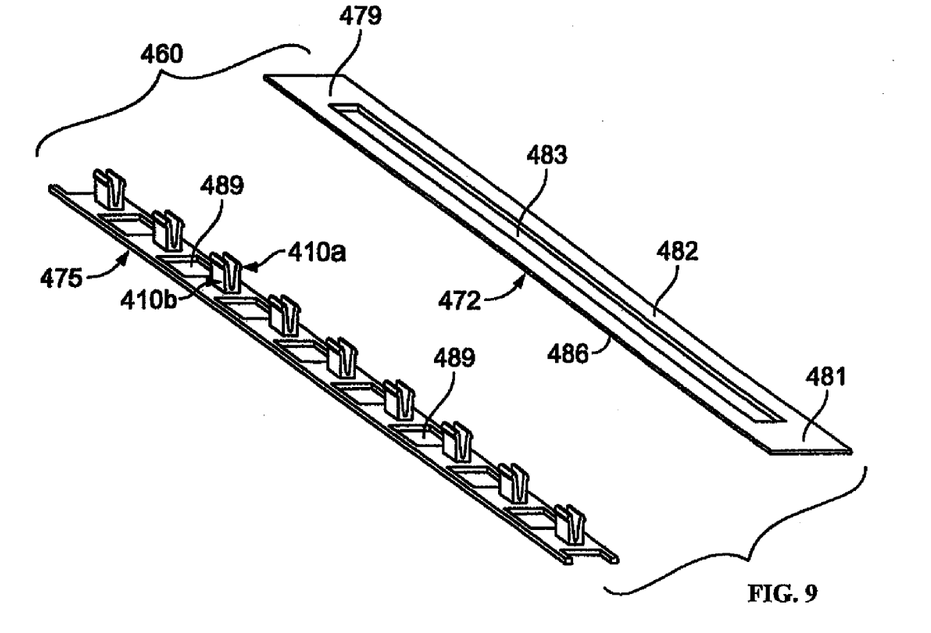
FIG. 9 is an exploded, perspective plan view of components used to form a fifth embodiment of a joint which incorporates the features of the present invention.
Figure 10:
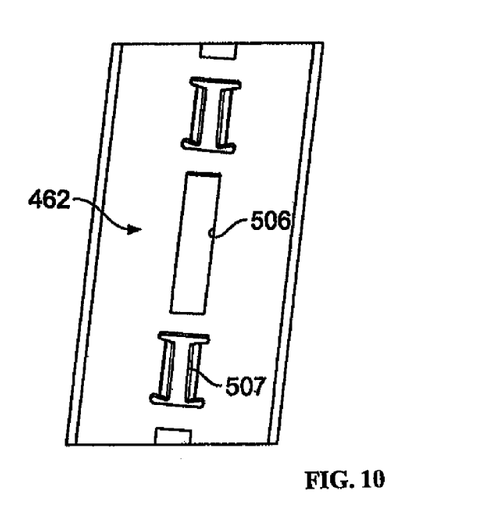
FIG. 10 is a perspective view of the portion of the components shown in FIG. 9, but in an assembled condition.
Figure 12:
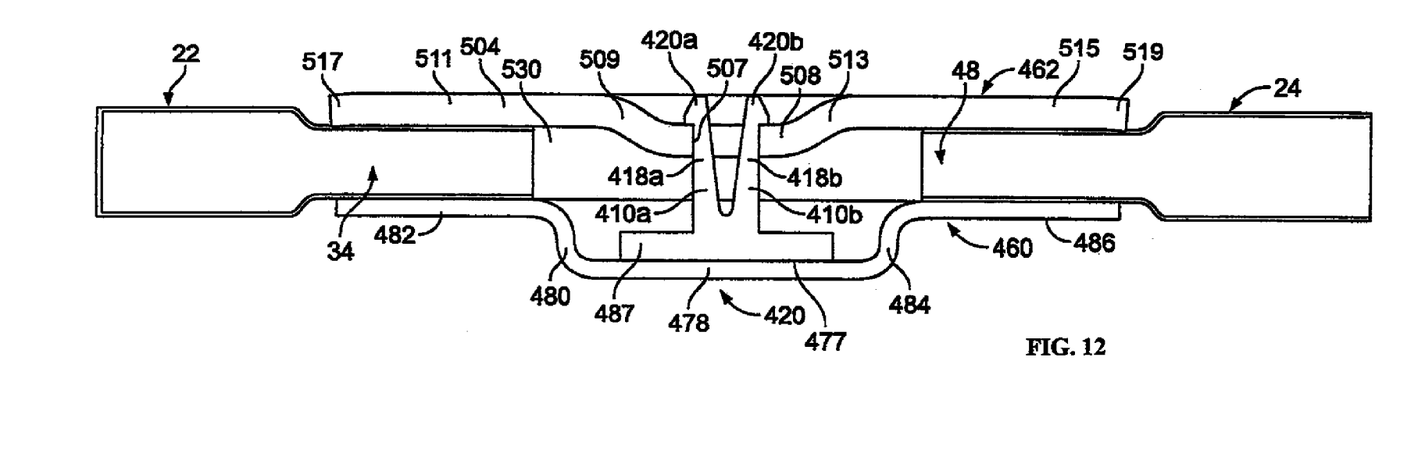
FIG. 12 is a cross-sectional view of the portion of the component shown in FIG. 11, but in an assembled condition.
Figure 13:
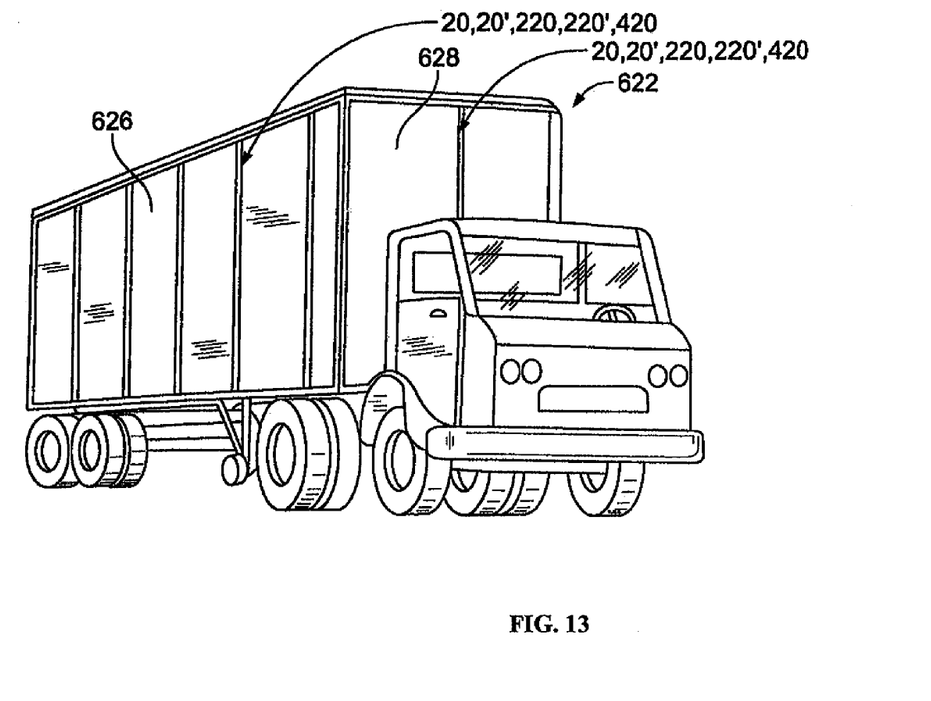
FIG. 13 is a perspective view of the exterior of a trailer which includes a joint formed in accordance with the present invention.
Figure 14:
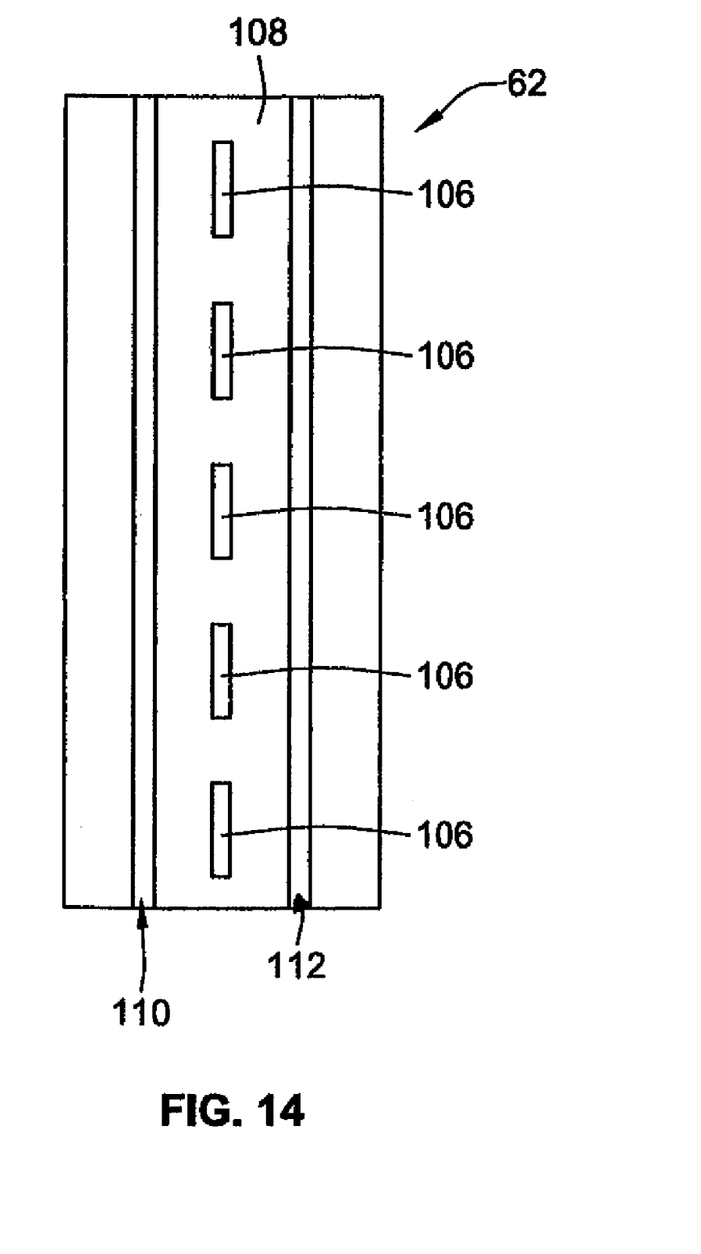
FIG. 14 is a plan view of a strip which incorporates the features of the invention.

The present invention provides a joint construction 20, 20', 220, 220' and 420 (shown only in partial form) for a sidewall 626, a front wall (nose) 628 or roof 632 of a vehicle 622, such as a trailer (dry van or refrigerated trailer), as shown in FIG. 12, or the like. A first embodiment of the joint construction 20 is shown in FIGS. 1 and 2; a second embodiment of the joint construction 20' is shown in FIGS. 3 and 4; a third embodiment of the joint construction 220 is shown in FIGS. 5 and 6; a fourth embodiment of the joint construction 220' is shown in FIGS. 7 and 8; and a fifth embodiment of the joint construction 420 is shown in FIGS. 9 and 10.

Figure 1:
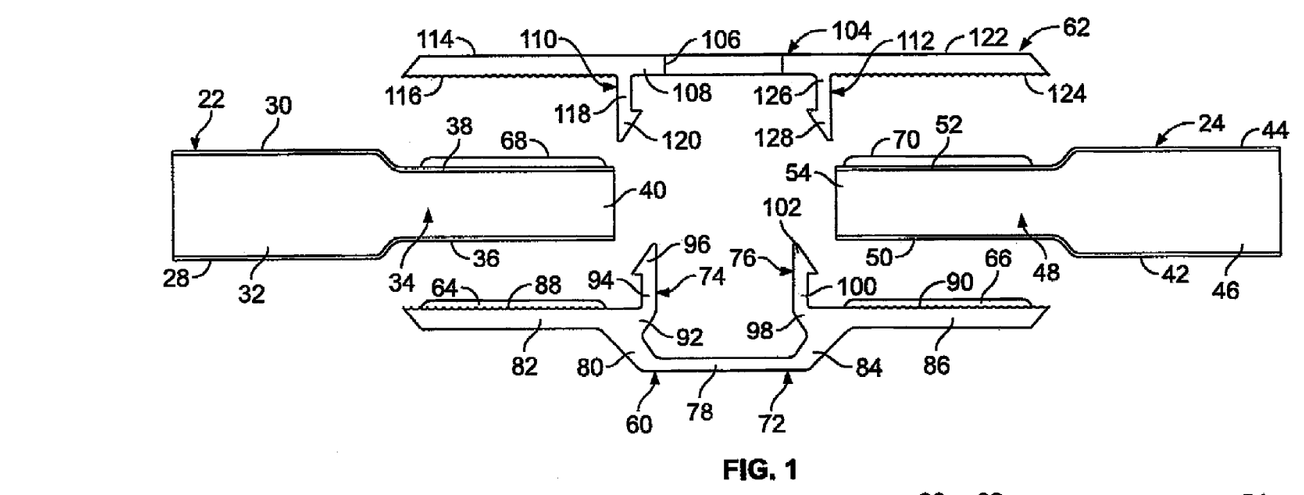
FIG. 1 is an exploded, cross-sectional view of a portion of a component of a trailer showing a first embodiment of a joint which incorporates the features of the present invention.
Figure 2:
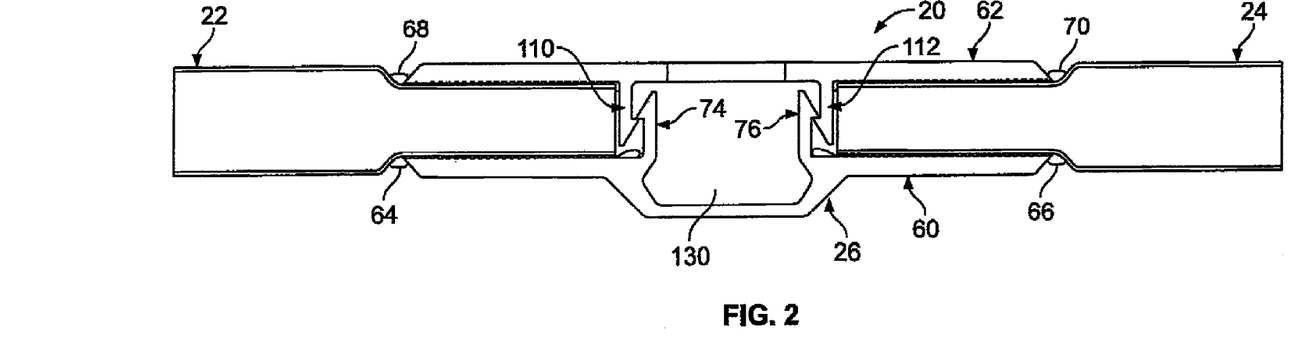
FIG. 2 is a cross-sectional view of the portion of the component shown in FIG. 1, but in an assembled condition.

Attention is now invited to the first embodiment of the joint construction 20 shown in FIGS. 1 and 2. The joint construction 20 is formed of a plurality of composite panels, for example composite panels 22 and 24; each pair of composite panels 22 and 24 being joined together by a joint 26. For purposes of clarity, the structure of the composite panels is described with respect to one pair of the composite panels 22 and 24 and the structure of the joint 26 is described with respect to one of the joints 26 between these composite panels 22 and 24, with the understanding the other composite panels and the joints between such other composite panels which form the components of the trailer 622 are the same.

Composite panel 22 has opposite ends and is formed from a first or outer skin 28, which defines an outer surface of the panel 22, and a second or inner skin 30, which defines an opposite inner surface of the panel 22, which are bonded to a compressible core member 32 sandwiched therebetween; the bonding being effected by known means such as an adhesive or by using the core material itself. Each end (only one of which is shown) of the composite panel 22 has a reduced thickness end portion 34 which has a thickness which is less than the thickness of the remainder of the composite panel 22. The reduced thickness end portion 34 may be formed by coining, or may be shaped during the manufacturing process without the use of coining. The reduced thickness end portion 34 includes an end section 36 formed at the end of the first skin 28, an end section 38 formed at the end of the second skin 30 and an end section 40 of the core member 32. The end section 36 is offset from the remainder of the first skin 28; the end section 38 is offset from the remainder of the second skin 30.

Composite panel 24 has opposite ends and is formed from a first or outer skin 42, which defines an outer surface of the panel 24, and a second or inner skin 44, which defines an opposite inner surface of the panel 24, which are bonded to a compressible core member 46 sandwiched therebetween; the bonding being effected by known means such as an adhesive or by using the core material itself. Each end (only one of which is shown) of the composite panel 24 has a reduced thickness end portion 48 which has a thickness which is less than the thickness of the remainder of the composite panel 24. The reduced thickness end portion 48 may be formed by coining, or may be shaped during the manufacturing process without the use of coining. The end portion 48 includes an end section 50 formed at the end of the first skin 42, an end section 52 formed at the end of the second skin 44 and a reduced thickness end section 54 of the core member 46. The end section 50 is offset from the remainder of the first skin 42; the end section 52 is offset from the remainder of the second skin 44.

The end portions 34 and 48 have generally equal thicknesses.

The skins 28, 30, 42 and 44 used in the composite panels 22 and 24 may be formed of fiberglass, aluminum or full hardened, high strength, high tension, galvanized steel or other suitable materials which provide strength and rigidity. Preferably, if formed of metal, each skin 28, 30, 42 and 44 is formed from galvanized steel and preferably, each skin 28, 30, 42 and 44 is greater or equal to thirteen thousandths of an inch in thickness. The core member 32 and 46 provided in each composite panel 22 and 24 may be formed from a solid plastic core or may be formed from polyurethane or a foamed thermoplastic, such as foamed high density polyethylene and, preferably made from foamed high density polyethylene (HDPE) or high density polypropylene. The core member 32 and 46 is resilient and compressible.

The joint 26 is formed from a cap 60 and a strip 62 which have portions provided on opposite sides of the composite panels 22 and 24, which mate together between the composite panels 22 and 24, and which are bonded to the end portions 34 and 48 of the composite panels 22 and 24 by adhesive films or paste 64, 66, 68 and 70.

The cap 60 may be formed from metal or plastic and may be formed by molding, extruding or by other known means. The cap 60 includes a base wall 72, a first tang 74 and a second tang 76.

The base wall 72 has a flat, solid center section 78 which is parallel to the composite panels 22 and 24, a first intermediate section 80 which angles from the center section 78 towards the end portion 34, a first end section 82 which extends outwardly from the opposite end of the first intermediate section 78, a second intermediate section 84 which angles from the center section 78 toward the end portion 48, and a second end section 86 which extends outwardly from the opposite end of the second intermediate section 84. The center section 78, the first end section 82 and the second end section 86 are parallel to each other and are parallel to the composite panels 22 and 24 when attached thereto as described herein. The first and second end sections 82 and 86 are co-planar and are offset from the center section 78. A plurality of striations 88 are provided on a surface of the first end section 82 which faces composite panel 22, and a plurality of striations 90 are provided on a surface of the second end section 86 which faces composite panel 24. The striations 88 and 90 may be formed during extruding or molding, or are machined into the end sections 82 and 86. The striations 88 and 90 are optional. The ends of the base wall 72 may be angled, as shown, or straight. As shown, the angle of the ends of the base wall 72 can be such that base wall 72 is longest at the surface proximate to the composite panels 22 and 24. Alternatively, the angle of the ends of the base wall 72 can be such that base wall 72 is shortest at the surface proximate to composite panels 22 and 24 (not shown).

The first tang 74 extends from the first intermediate section 80 toward the strip 62. A first portion 92 of the first tang 74 extends from the first intermediate section 80 and is angled toward the second composite panel 24, and a second portion 94 extends from the opposite end of the first portion 92 toward the strip 62. The second portion 92 is perpendicular to the center section 78. The second portion 92 has a length which is less than the thickness of the end section 34. The second portion 94 has an interlock, which in the preferred embodiment is a one-sided barb 96 which faces the end of the composite panel 22. The one-sided barb 96 has a beveled surface at its end. The second tang 76 extends from the second intermediate section 84 toward the strip 62. A first portion 98 of the second tang 76 extends from the second intermediate section 84 and is angled toward the strip 62, and a second portion 100 extends from the opposite end of the first portion 98 toward the strip 62. The second portion 100 is perpendicular to the center section 78. The second portion 100 has a length which is less than the thickness of the end section 48. The second portion 100 has an interlock, which in the preferred embodiment is a one-sided barb 102 which faces the end of the composite panel 24. The one-sided barb 102 has a beveled surface at its end.

The strip 62 may be formed from metal or plastic and may be formed by molding, extruding or by other known means. The strip 62 is formed from a flat base wall 104 having plurality of spaced apart apertures 106 provided through a center section 108 thereof, a first one-sided tang 110, and a second one-sided tang 112. The ends of the base wall 104 may be angled, as shown, or straight. As shown, the angle of the ends of the base wall 104 can be such that base wall 104 is longest at the surface proximate to the composite panels 22 and 24. Alternatively, the angle of the ends of the base wall 104 can be such that base wall 104 is shortest at the surface proximate to the composite panels 22 and 24 (not shown).

The first tang 110 is provided at a position spaced from the end of the base wall 104 such that a first end section 114 is defined between the first tang 110 and the end of the base wall 104. A plurality of striations 116 are provided on a surface of the first end section 114 which faces the composite panel 22. The first tang 110 has a portion 118 which extends from the center section 108 toward the cap 60. The portion 118 is perpendicular to the base wall 104 and has a length which is less than the thickness of the end section 34. An interlock, which in the preferred embodiment is a one-sided barb 120, is provided on the portion 118 and faces the second composite panel 24. The one-sided barb 120 has a beveled surface at its end. The second tang 112 is provided at a position spaced from the opposite end of the base wall 104 such that a second end section 122 is defined between the second tang 112 and the end of the base wall 104. A plurality of striations 124 are provided on a surface of the second end section 122 which faces the composite panel 24. The striations 116 and 124 may be formed during extruding or molding, or are machined into the end sections 114 and 122. The striations 116 and 124 are optional. The second tang 112 has a portion 126 which extends from the center section 108 toward the cap 60. The portion 126 is perpendicular to the base wall 104 and has a length which is less than the thickness of the end section 48. An interlock, which in the preferred embodiment is a one-sided barb 128, is provided on the portion 126 and the composite panel 22. The one-sided barb 128 has a beveled surface at its end.

To form the joint 26, the ends of the first and second panels 22, 24 are spaced apart from each other to form a gap therebetween. The cap 60 and the strip 62 are bonded by the adhesive films or paste 64, 66, 68 and 70 to the outer surfaces of the end portions 34 and 48, and are mated together via the tangs 74 and 110; 76 and 112 which pass into the gap. As a result, the end portions 34 and 48 are sandwiched between the cap 60 and the strip 62.

Adhesive films or paste 68 and 70 are formed on the surfaces of the end sections 38 and 52 which face the composite panels 22 and 24. The end sections 114 and 122 of the strip 62 are then seated against the surfaces of the end sections 38 and 52, thereby sandwiching the adhesive films or paste 68 and 70 between the strip 62 and the end portions 34 and 48. The tangs 110 and 112 may abut the ends of the composite panels 22 and 24 or may be spaced therefrom. Alternatively, the adhesive films or paste 68 and 70 can be formed on the surfaces of the end sections 114 and 122 of the strip 62. The striations 116 and 124, if provided, ensure the thicknesses of the adhesive films or paste 68 and 70 when the strip 62 is seated against the surfaces of the end sections 34 and 48.

Adhesive films or paste 64 and 66 are formed on the surfaces of the end sections 82 and 86 of the cap 60 which face the composite panels 22 and 24. The end portions 82 and 86 of the cap 60 are then seated against the surfaces of the end sections 36 and 50, thereby sandwiching the adhesive films or paste 64 and 66 between the cap 60 and the end sections 36 and 50. Alternatively, the adhesive films or paste 64 and 66 can be formed on the surfaces of the end sections 36 and 50. The striations 88 and 90, if provided, ensure the thicknesses of the adhesive films or paste 64 and 66 for handling and the like when the cap 60 is seated against the surfaces of the end sections 34 and 48.

When the cap 60 is seated against the end portions 34 and 48 of the composite panels 22 and 24, the tangs 74 and 76 of the cap 60 engage the tangs 110 and 112 of the strip 62. When the beveled surfaces contact each other, the tangs 74 and 76 on the cap 60 will flex toward each other until one-sided barb 96 engages with one-sided barb 120 and one-sided barb 102 engages with one-sided barb 128. To effect this, a load is placed on the cap 60 and on the strip 62 to compress the end portions 40 and 54 of the core members 32 and 46, to an extent until the one-sided barbs 96 and 120; 102 and 128 interengage. When the load is removed, the end portions 40 and 54 of the core members 32 and 46 will expand to ensure a tight fit between the tangs 74 and 110; 76 and 112. Alternatively, a load does not need to be placed on the cap 60 and on the strip 62 and instead, the tangs 74 and 110; 76 and 112 are moved into interengagement. The mechanical connection of the tangs 74 and 1 10; 76 and 112 provide integral clamping for handling prior to curing of the adhesive films or paste 64, 66, 68 and 70, and providing inherent stiffness and clamp load during the curing cycle of the adhesive films or paste 64, 66, 68 and 70.

Because of this construction, the base panel 104 of the strip 62 is flush with the exposed surface of composite panels 22 and 24. The end portion 36 provides a well for any adhesive film or paste 64 that is squeezed out from between the cap 60 and the composite panel 22; the end portion 50 provides a well for any adhesive film or paste 66 that is squeezed out from between the cap 60 and the composite panel 24. If the angle of the ends of the base wall 72 are such that base wall 72 is shortest at the surface proximate to the composite panels 22 and 24, this provides an overhang which will hide the squeeze-out of any adhesive film or paste 64 and 66. The end section 38 provides a well for any adhesive film or paste 68 that is squeezed out from between the strip 62 and the composite panel 22; the end section 52 provides a well for any adhesive film or paste 70 that is squeezed out from between the strip 62 and the composite panel 24. If the angle of the ends of the base wall 104 are such that the base wall 104 is shortest at the surface proximate to the composite panels 22 and 24, this provides an overhang which will hide the squeeze-out of any adhesive film or paste 68 and 70.

Preferably, the tangs 74, 76, 110 and 1 12 extend along the entire height of the base walls 72 and 104. Alternatively, the tangs 74, 76, 110 and 112 can be provided at predetermined locations along the height of the base walls 72 and 104 or do not need to extend the entire height of the base walls 72 and 104, provided, of course that they are capable of interengaging with each other. In addition, the directions of the one-sided barbs 96, 102, 120 and 128 can be reversed such that tangs 110 and 112 are provided instead on cap 60 and tangs 74 and 76 are provided instead on strip 60.

This joint construction 20 provides a cavity 130 into which outside devices, such as cargo securement devices (not shown), can be passed via apertures 106. The cap 60 provides a clearance relief for the outside devices. Preferably, in a refrigerated trailer, the cavity 130 is filled with foam to reduce heat transfer. If filled with foam, the apertures 106 are not provided.

While reduced end sections 34 and 48 are described, it is to be understood that the joint construction 20 can be formed without the reduced end sections 34 and 48 such that the first and second skins 28, 42; 30, 44 of the panels 22 and 24 would be planar. While reduced end sections 34 and 48 are shown and described, it is to be understood that the joint construction 20 can be formed with the reduced end sections 34 and 48 only having either the first or second skins 28, 42; 30, 44 having an offset end section (for example, only the first skins 28 and 42 have the offset end sections 36 and 50, and end sections 38 and 52 of the second skins 30 and 44 are planar with the remainder of the second skins 30 and 44). The cap 60 can be flat.

Attention is now invited to the second embodiment of the joint construction 20' shown in FIGS. 3 and 4. The joint construction 20' is identical to that shown in the first embodiment, except that the plurality of panels, for example panels 22' and 24' are not composite panels. Instead, the panels 22' and 24' are formed from a single sheet or multiple sheets of metal, preferably steel and/or aluminum. The cap 60 and the strip 62 are identically formed to that shown in the first embodiment and therefore, the specifics of same are not repeated. Accordingly, the cap 60 and the strip 62 bear the same reference numerals as the first embodiment.

Panel 22' has opposite ends and has a first or outer surface 28' and an opposite second or inner surface 30'. If multiple sheets are used to formed the panel 22', the sheets are secured together by suitable means, such as adhesive or by fasteners. Each end (only one of which is shown) of the panel 22' has a reduced thickness end portion 34' which has a thickness which is less than the thickness of the remainder of the panel 22'. The reduced thickness end portion 34' is shaped during the manufacturing process. The reduced thickness end portion 34' has a surface 36' which is offset from the remainder of the surface 30' and a surface 38' which is offset from the remainder of the surface 30'.

Panel 24' has opposite ends and has a first or outer surface 42' and an opposite second or inner surface 44'. If multiple sheets are used to form the panel 24', the sheets are secured together by suitable means, such as adhesive or by fasteners. Each end (only one of which is shown) of the panel 24' has a reduced thickness end portion 48' which has a thickness which is less than the thickness of the remainder of the panel 24'. The reduced thickness end portion 48' is shaped during the manufacturing process. The reduced thickness end portion 48' has a surface 50' which is offset from the remainder of the surface 42' and a surface 52' which is offset from the remainder of the surface 44'.

The end portions 34' and 48' have generally equal thicknesses.

To form the joint 26', the ends of the first and second panels 22', 24' are spaced apart from each other to form a gap therebetween. The cap 60 and the strip 62 are bonded by adhesive films or paste 64', 66', 68' and 70' to the surfaces 36' and 50'; 38' and 52' of the end portions 34' and 48', and are mated together via the tangs 74 and 110; 76 and 112 which pass into the gap. As a result, the end portions 34' and 48' are sandwiched between the cap 60 and the strip 62.

Adhesive films or paste 68' and 70' are formed on the surfaces 38' and 52' of the end portions 34' and 48' which face the panels 22' and 24'. The end sections 114 and 122 of the strip 62 are then seated against the surfaces 38' and 52', thereby sandwiching the adhesive films or paste 68' and 70' between the strip 62 and the end portions 34' and 48'. The tangs 110 and 112 may abut the ends of the panels 22' and 24' or may be spaced therefrom. Alternatively, the adhesive films or paste 68' and 70' can be formed on the surfaces of the end sections 114 and 122 of the strip 62. The striations 116 and 124, if provided, on the end sections 114 and 122 ensure the thicknesses of the adhesive films or paste 68' and 70' for handling and the like when the strip 62 is seated against the surfaces 38' and 52'.

Adhesive films or paste 64' and 66' are formed on the surfaces of the end sections 82 and 86 of the cap 60 which face the panels 22' and 24'. The end portions 82 and 86 of the cap 60 are then seated against the surfaces 36' and 50', thereby sandwiching the adhesive films or paste 64' and 66' between the cap 60 and the end sections 36' and 50'. Alternatively, the adhesive films or paste 64' and 66' can be formed on the surfaces 36' and 50'. The striations 88 and 90, if provided, ensure the thicknesses of the adhesive films or paste 64 and 66 for handling and the like when the cap 60 is seated against the surfaces of the end sections 34 and 48.

When the cap 60 is seated against the end portions 34' and 48' of the panels 22' and 24', the tangs 74 and 76 of the cap 60 engage the tangs 110 and 112 of the strip 62. When the beveled surfaces contact each other, the tangs 74 and 76 on the cap 60 will flex toward each other until one-sided barb 96 engages with one-sided barb 120 and one-sided barb 102 engages with one-sided barb 128. As a result, while the adhesive films or paste 64', 66', 68' and 70' are curing, the mechanical joining features in the joint 26' provide integral clamping for handling prior to curing of the adhesive films or paste 64', 66', 68' and 70', and provide inherent stiffness and clamp load during the curing cycle.

Because of this construction, the base panel 104 of the strip 62 is flush with the exposed surface of composite panels 22' and 24'. The end portion 36' provides a well for any adhesive film or paste 64 that is squeezed out from between the cap 60 and the composite panel 22'; the end portion 50' provides a well for any adhesive film or paste 66' that is squeezed out from between the cap 60 and the composite panel 24'. If the angle of the ends of the base wall 72 are such that base wall 72 is shortest at the surface proximate to the composite panels 22' and 24', this provides an overhang which will hide the squeeze-out of any adhesive film or paste 64' and 66'. The offset surface 38' provides a well for any adhesive film or paste 68' that is squeezed out from between the strip 62 and the composite panel 22'; the surface 52' provides a well for any adhesive film or paste 70' that is squeezed out from between the strip 62 and the composite panel 24'. If the angle of the ends of the base wall 104 are such that the base wall 104 is shortest at the surface proximate to the composite panels 22' and 24', this provides an overhang which will hide the squeeze-out of any adhesive film or paste 68' and 70'.

This joint construction 20' provides a cavity 130' into which outside devices, such as cargo securement devices (not shown), can be passed via apertures 106. The cap 60 provides a clearance relief for the outside devices. Preferably, in a refrigerated trailer, the cavity 130' is filled with foam to reduce heat transfer. If filled with foam, the apertures 106 are not provided.

While reduced end sections 34' and 48' are described, it is to be understood that the joint construction 20' can be formed without the reduced end sections 34' and 48' such that the panels 22' and 24' would be planar. While reduced end sections 34' and 48' are shown and described, it is to be understood that the joint construction 20' can be formed with the reduced end sections 34' and 48' only having either the first or second end sections 36', 50'; 38', 52' being offset (for example, only the first end sections 36', 50' are offset, and the second end sections 38', 52' are planar with the remainder of the second skins 30', 44'). The cap 60' can be flat.

In the first and second embodiments, preferably, the cap 60 is provided on the exterior of the trailer 622 and the strip 62 is provided on the interior of the trailer 622. If desired, however, the cap 60 may be provided on the interior of the trailer 622 and the strip 62 may be provided on the exterior of the trailer 622. If this latter configuration is provided, the apertures provided in the strip 62 would instead be provided in the center section 78 of the cap 60 (thereby making cap 60 a strip, and making strip 62 a cap).

In the first and second embodiments, preferably, the tangs 74, 76, 110 and 112 extend along the entire height of the base walls 72 and 104. Alternatively, the tangs 74', 76', 110 and 112 can be provided at predetermined locations along the height of the base walls 72 and 104 or do not need to extend the entire height of the base walls 72 and 104, provided, of course that they are capable of interengaging with each other. In addition, the directions of the one-sided barbs 96, 102, 120 and 128 can be reversed such that tangs 110 and 112 are provided instead on cap 60 and tangs 74 and 76 are provided instead on strip 60.

Attention is now invited to the third embodiment of the joint construction 220 shown in FIGS. 5 and 6. The joint construction 220 is formed of a plurality of composite panels, for example composite panels 222 and 224; each pair of composite panels 222 and 224 being joined together by a joint 226. For purposes of clarity, the structure of the composite panels is described with respect to one pair of the composite panels 222 and 224 and the structure of the joint 226 is described with respect to one of the joints 226 between these composite panels 222 and 224, with the understanding the other composite panels and the joints between such other composite panels which form the trailer components are the same.

Composite panel 222 has opposite ends and is formed from a first or outer skin 228, which defines an outer surface of the panel 222, and a second or inner skin 230, which defines an opposite inner surface of the panel 222, which are bonded to a compressible core member 232 sandwiched therebetween; the bonding being effected by known means such as an adhesive or by using the core material itself. Each end (only one of which is shown) of the composite panel 222 has a reduced thickness end portion 234 which has a thickness which is less than the thickness of the remainder of the composite panel 222. The reduced thickness end portion 234 may be formed by coining, or may be shaped during the manufacturing process without the use of coining. The reduced thickness end portion 234 includes an end section 236 formed at the end of the first skin 228, an end section 238 formed at the end of the second skin 230 and an end section 240 of the core member 232. The end section 236 is co-planar with the remainder of the first skin 228; the end section 238 is offset from the remainder of the second skin 230.

Composite panel 224 has opposite ends and is formed from a first or inner skin 242, which defines an inner surface of the panel 224, and a second or outer skin 244, which defines an opposite outer surface of the panel 224, which are bonded to a compressible core member 246 sandwiched therebetween; the bonding being effected by known means such as an adhesive or by using the core material itself. Each end (only one of which is shown) of the composite panel 224 has a reduced thickness end portion 248 which has a thickness which is less than the thickness of the remainder of the composite panel 224. The reduced thickness end portion 248 may be formed by coining, or may be shaped during the manufacturing process without the use of coining. The end portion 248 includes an end section 250 formed at the end of the first skin 242, an end section 252 formed at the end of the second skin 244 and a reduced thickness end section 254 of the core member 246. The end section 250 is co-planar with the remainder of the first skin 242; the end section 252 is offset from the remainder of the second skin 244.

The end portions 234 and 248 have generally equal thicknesses.

The skins 228, 230, 242 and 244 used in the composite panels 222 and 224 may be formed of fiberglass, aluminum or full hardened, high strength, high tension, galvanized steel or other suitable materials which provide strength and rigidity. Preferably, if formed of metal, each skin 228, 230, 242 and 244 is formed from galvanized steel and preferably, each skin 228, 230, 242 and 244 is greater or equal to thirteen thousandths of an inch in thickness. The core member 232 and 246 provided in each composite panel 222 and 224 may be formed from a solid plastic core or may be formed from polyurethane or a foamed thermoplastic, such as foamed high density polyethylene and, preferably made from foamed high density polyethylene (HDPE) or high density polypropylene. The core member 232 and 246 is resilient and compressible.

The joint 226 is formed from a cap 260 and a strip 262 which have portions provided on opposite sides of the composite panels 222 and 224, which mate together between the composite panels 222 and 224, and which are bonded to the end portions 234 and 248 of the composite panels 222 and 224 by adhesive films or paste 264, 266, 268 and 270.

The cap 260 may be formed from metal or plastic and may be formed by molding, extruding or by other known means. The cap 260 is formed from a base wall 272, a first tang 274 and a second tang 276.

The base wall 272 has a flat, solid center section 278 which is parallel to the composite panels 222 and 224, a first intermediate section 280 which angles towards the end portion 234, a first end section 282 which extends outwardly from the opposite end of the first intermediate section 278, a second intermediate section 284 which angles from the center section 278 toward the end portion 248, and a second end section 286 which extends outwardly from the opposite end of the second intermediate section 284. The center section 278, the first end section 282 and the second end section 286 are parallel to each other and are parallel to the composite panels 222 and 224 when attached thereto as described herein. The first and second end sections 282 and 286 are co-planar and are offset from the center section 278. A plurality of striations (not shown) may be provided on an inner surface of the first end section 282 and a plurality of striations (not shown) may be provided on an inner surface of the second end section 286. The striations may be formed during extruding or molding, or are machined into the end sections 282 and 286. The striations are optional. The ends of the base wall 272 may be angled, as shown, or straight. As shown, the angle of the ends of the base wall 272 can be such that base wall 272 is longest at the surface proximate to the composite panels 222 and 224. Alternatively, the angle of the ends of the base wall 272 can be such that base wall 272 is shortest proximate to the composite panel 222 and 224 (not shown).

A portion 292 of the first tang 274 extends from the second end of the first end section 282 toward the strip 262. The portion 292 is perpendicular to the center section 278. The portion 292 has a length which is less than the thickness of the end section 234. The second portion 294 has an interlock, which in the preferred embodiment is a double-sided barb 296. Each side of the double-sided barb 296 has a beveled surface at its end. A portion 298 of the second tang 276 extends from the second end section 286 inwardly toward the strip 262. The portion 298 is perpendicular to the center section 278. The portion 298 has a length which is less than the thickness of the end section 248. The portion 298 has an interlock, which in the preferred embodiment is a double-sided barb 302. Each side of the double-sided barb 302 has a beveled surface at its end.

The strip 262 may be formed from metal or plastic and may be formed by molding, extruding or by other known means. The strip 262 is formed from a flat base wall 304 having plurality of spaced apart apertures 306 provided through a center section 308 thereof, a first pair of facing one-sided tangs 310*a* and 310*b*, and a second pair of facing one-sided tangs 312*a* and 312*b*. The ends of the base wall 304 may be angled, as shown, or straight. As shown, the angle of the ends of the base wall 304 can be such that base wall 304 is longest at the surface proximate to the composite panel 222 and 224. Alternatively, the angle of the ends of the base wall 304 can be such that base wall 304 is shortest at the surface proximate to the composite panel 222 and 224 (not shown).

The first pair of one-sided tangs 310a and 310b are provided at a position spaced from the end of the base wall 304 such that a first end section 314 is defined between the first tangs 310a and 310b and the end of the base wall 304. A plurality of striations (not shown) may be provided on an inner surface of the first end section 314. Each first tang 310a and 310b has a portion 318a and 318b which extends from the center section 308 toward the cap 260. The portions 318a and 318b are perpendicular to the base wall 304. Each portion 318a and 318b has a length which is less than the thickness of the end section 234. A respective interlock, which in the preferred embodiment is barb 320a and 320b, is provided on the portions 318a and 318b and face each other. Each barb 320a and 320b has a beveled surface at its end. The second pair of second tangs 312 are provided at a position spaced from the opposite end of the base wall 304 such that a second end section 322 is defined between the second tangs 312a and 312b and the end of the base wall 304. A plurality of striations (not shown) may be provided on an inner surface of the second end section 322. The striations may be formed during extruding or molding, or are machined into the end sections 314 and 322. The striations are optional. Each second tang 312a and 312b has a portion 326a and 326b which extends from the center section 308 toward the cap 260. The portions 326a and 326 are perpendicular to the base wall 304. Each portion 326a and 326b has a length which is less than the thickness of the end section 248. A respective interlock, which in the preferred embodiment is barb 328a and 328b, is provided on the portions 326a and 326b and face each other. Each barb 328a and 328b has a beveled surface at its end.

To form the joint 226, the ends of the first and second panels 122, 124 are spaced apart from each other to form a gap therebetween. The cap 260 and the strip 262 are bonded by the adhesive films or paste 264, 266, 268 and 270 to the surfaces of the end portions 234 and 248 and are mated together via the tangs 274 and 310; 276 and 312 which pass into the gap. As a result, the end portions 234 and 248 are sandwiched between the cap 260 and the strip 262.

Adhesive films or paste 268 and 270 are formed on the surfaces of the end sections 238 and 252. The end sections 314 and 322 of the strip 262 are then seated against the surfaces of the end sections 238 and 252, thereby sandwiching the adhesive films or paste 268 and 270 between the strip 262 and the end portions 234 and 248. The tangs 31 0a and 312b may abut the ends of the composite panels 222 and 224 or may be spaced therefrom. Alternatively, the adhesive films or paste 268 and 270 can be formed on the surfaces of the end sections 314 and 322 of the strip 262. Striations, if provided, on the end sections 314 and 322 ensure the thicknesses of the adhesive films or paste 268 and 270 for handling and the like when the strip 262 is seated against the surfaces of the end sections 234 and 248.

Adhesive films or paste 264 and 266 are formed on the surfaces of the end sections 282 and 286 of the cap 260. The end portions 282 and 286 of the cap 260 are then seated against the surfaces of the end sections 236 and 250, thereby sandwiching the adhesive films or paste 264 and 266 between the cap 260 and the end sections 236 and 250. Alternatively, the adhesive films or paste 264 and 266 can be formed on the surfaces of the end sections 236 and 250. The striations, if provided, ensure the thicknesses of the adhesive films or paste 264 and 266 for handling and the like when the cap 260 is seated against the surfaces of the end sections 234 and 248.

When the cap 260 is seated against the end portions 234 and 248 of the composite panels 222 and 224, the first tang 274 engages between the first pair of tang 310a and 31b of the strip 262, and the second tang 276 engages between the second pair of tang 312a and 312b of the strip 262. When the beveled surfaces contact each other, the tangs 310b and 312a on the strip 262 will flex each other until double-sided barb 296 engages with barbs 320a and 320b, and double-sided barb 302 engages with barbs 328a and 328b. To effect this, a load is placed on the cap 260 and on the strip 262 to compress the end portions 240 and 254 of the core members 232 and 246, to an extent until the barbs 296, 320a and 320b; 302, 328a and 328b interengage. When the load is removed, the end portions 240 and 254 of the core members 232 and 246 will expand to ensure a tight fit between the tangs 274 and 310; 276 and 312. Alternatively, a load does not need to be placed on the cap 260 and on the strip 262 and instead, the tangs 274 and 310; 276 and 312 are moved into interengagement. The mechanical connection of the tangs 274 and 310; 276 and 312 provide integral clamping for handling prior to curing of the adhesive films or paste 264, 266, 268 and 270, and provide inherent stiffness and clamp load during the curing cycle of the adhesive films or paste 264, 266, 268 and 270.

Because of this construction, the base wall 304 of the strip 262 is flush with the exposed surface of composite panels 222 and 224. If the angle of the ends of the base wall 272 of the cap 260 is such that base wall 272 is shortest at the surface proximate to the composite panels 222 and 224, this provides an overhang which will hide the squeeze-out of any adhesive film or paste 264 and 266. The end section 238 provides a well for any adhesive film or paste 268 that is squeezed out from between the strip 262 and the composite panel 222; the end section 252 provides a well for any adhesive film or paste 270 that is squeezed out from between the strip 262 and the composite panel 224. If the angle of the ends of the base wall 304 are such that the base wall 304 is shortest at the surface proximate to the composite panels 222 and 224, this provides an overhang which will hide the squeeze-out of any adhesive film or paste 268 and 270.

Preferably, the tangs 274, 276, 310a, 310b, 312a and 312b extend along the entire height of the base walls 272 and 304. Alternatively, the tangs 274, 276, 310a, 310b, 312a and 312b can be provided at predetermined locations along the height of the base walls 272 and 304 or do not need to extend the entire height of the base walls 272 and 304, provided, of course that they are capable of interengaging with each other. In addition, the tangs 274, 276, 310a, 310b, 312a and 312b can be reversed such that tangs 310a, 310b, 312a and 312b are provided instead on cap 260 and tangs 274 and 276 are provided instead on strip 262.

This joint construction 220 provides a cavity 330 into which outside devices, such as cargo securement devices (not shown), can be passed via apertures 306. The cap 260 provides a clearance relief for the outside devices. Preferably, in a refrigerated trailer, the cavity 330 is filled with foam to reduce heat transfer. If filled with foam, the apertures 306 are not provided.

While reduced end sections 234 and 248 are described, it is to be understood that the joint construction 220 can be formed without the reduced end sections 234 and 248 such that the first and second skins 228, 230; 242, 244 of the panels 222 and 224 would be planar. While reduced end sections 234 and 248 are shown and described, it is to be understood that the joint construction 220 can be formed with both first and second skins 228, 242; 230, 244 offset at the end sections, or having the first skins 228 and 242 with offset end sections 236 and 250 and end sections 238, 252 of the second skins 230 and 244 being planar with the remainder of the second skins 230 and 244. The cap 260 can be flat.

Attention is now invited to the fourth embodiment of the joint construction 220' shown in FIGS. 7 and 8. The joint construction 220' is identical to that shown in the third embodiment, except that the plurality of panels, for example panels 222' and 224' are not composite panels. Instead, the panels 222' and 224' are formed from a single sheet or multiple sheets of metal, preferably steel and/or aluminum. The cap 260 and the strip 262 are identically formed to that shown in the third embodiment and therefore, the specifics of same are not repeated. Accordingly, the cap 260 and the strip 262 bear the same reference numerals as the third embodiment.

Panel 222' has opposite ends and has a first or outer surface 228' and an opposite second or inner surface 230'. If multiple sheets are used to form the panel 222', the sheets are secured together by suitable means, such as adhesive or by fasteners. Each end (only one of which is shown) of the panel 222' has a reduced thickness end portion 234' which has a thickness which is less than the thickness of the remainder of the panel 222'. The reduced thickness end portion 234' is shaped during the manufacturing process. The reduced thickness end portion 234' has a surface 236' which is co-planar with the remainder of the surface 230' and a surface 238' which is offset from the remainder of the surface 230'.

Panel 224' has opposite ends and has a first surface 242' and a second opposite surface 244'. If multiple sheets are used to form the panel 224', the sheets are secured together by suitable means, such as adhesive or by fasteners. Each end (only one of which is shown) of the panel 224' has a reduced thickness end portion 248' which has a thickness which is less than the thickness of the remainder of the panel 224'. The reduced thickness end portion 248' is shaped during the manufacturing process. The reduced thickness end portion 248' has a surface 250' which is co-planar with the remainder of the surface 242' and a surface 252' which is offset from the remainder of the surface 244'.

The end portions 234' and 248' have generally equal thicknesses.

To form the joint 226', the ends of the first and second panels 222', 224' are spaced apart from each other to form a gap therebetween. The cap 260 and the strip 262 are bonded by adhesive films or paste 264', 266', 268' and 270' to the surfaces 236' and 250'; 238' and 252' of the end portions 234' and 248', and are mated together via the tangs 274 and 310a, 310b; 276 and 312a, 312b which pass into the gap. As a result, the end portions 234' and 248' are sandwiched between the cap 260 and the strip 262.

Adhesive films or paste 268' and 270' are formed on the surfaces 238' and 252' of the end portions 234' and 248' which face the panels 222' and 224'. The end sections 314 and 322 of the strip 262 are then seated against the surfaces 238' and 252', thereby sandwiching the adhesive films or paste 268' and 270' between the strip 262 and the end portions 234' and 248'. The tangs 310a and 312b may abut the ends of the panels 222' and 224' or may be spaced therefrom. Alternatively, the adhesive films or paste 268' and 270' can be formed on the surfaces of the end sections 314 and 322 of the strip 262. The striations, if provided, on the end sections 314 and 322 ensure the thicknesses of the adhesive films or paste 268' and 270' for handling and the like when the strip 262 is seated against the surfaces 238' and 252'.

Adhesive films or paste 264' and 266' are formed on the surfaces of the end sections 282 and 286 of the cap 260 which face the panels 222' and 224'. The end portions 282 and 286 of the cap 260 are then seated against the surfaces 236' and 250', thereby sandwiching the adhesive films or paste 264' and 266' between the cap 260 and the surfaces 236' and 250'. Alternatively, the adhesive films or paste 264' and 266' can be formed on the surfaces 236' and 250'. The striations, if provided, ensure the thicknesses of the adhesive films or paste 264' and 266' for handling and the like when the cap 260 is seated against the surfaces of the end sections 234' and 248'.

When the cap 260 is seated against the end portions 234' and 248' of the panels 222' and 224', the tangs 274 and 276 of the cap 260 engage the tangs 310a, 310b, 312a and 312b of the strip 262. When the beveled surfaces contact each other, the tangs 274 and 276 on the cap 260 will flex toward each other until barb 296 engages with barbs 320a and 320b and barb 302 engages with barbs 328a and 328b. As a result, while the adhesive films or paste 264', 266', 268' and 270' are curing, the mechanical joining features in the joint 226' provide integral clamping for handling prior to curing of the adhesive films or paste 264', 266', 268' and 270', and provide inherent stiffness and clamp load during the curing cycle.

Because of this construction, the base wall 304 of the strip 262 is flush with the exposed surface of composite panels 222' and 224'. If the angle of the ends of the base wall 272 are such that base wall 272 is shortest at the surface proximate to the composite panels 222' and 224', this provides an overhang which will hide the squeeze-out of any adhesive film or paste 264 and 266. The surface 238' provides a well for any adhesive film or paste 268' that is squeezed out from between the strip 262 and the composite panel 222'; the surface 252' provides a well for any adhesive film or paste 270' that is squeezed out from between the strip 262 and the panel 224'. If the angle of the ends of the base wall 304 are such that the base wall 304 is shortest at the surface proximate to the panels 222' and 224', this provides an overhang which will hide the squeeze-out of any adhesive film or paste 268' and 270'.

This joint construction 220' provides a cavity 330' into which outside devices, such as cargo securement devices (not shown), can be passed via apertures 306. The cap 260 provides a clearance relief for the outside devices. Preferably, in a refrigerated trailer, the cavity 330' is filled with foam to reduce heat transfer. If filled with foam, the apertures 306 are not provided.

While reduced end sections 234' and 248' are described, it is to be understood that the joint construction 220' can be formed without the reduced end sections 234' and 248' such that the panels 222' and 224' would be planar. While reduced end sections 234' and 248' are shown and described, it is to be understood that the joint construction 220' can be formed with the reduced end sections 234' and 248' having both the surfaces 236', 238', 250', 252' offset, or having the surfaces 236', 250' offset and the surfaces 238', 252' planar. The cap 260' can be flat.

In the third and fourth embodiments, preferably, the cap 60 is provided on the exterior of the trailer 622 and the strip 62 is provided on the interior of the trailer 622. If desired, however, the cap 60 may be provided on the interior of the trailer 622 and the strip 62 may be provided on the exterior of the trailer 622. If this latter configuration is provided, the apertures provided in the strip 62 would instead be provided in the center section 78 of the cap 60 (thereby making cap 60 a strip, and making strip 62 a cap).

In the third and fourth embodiments, preferably, the tangs 274, 276, 310a, 310b, 312a and 312b extend along the entire height of the base walls 272 and 304. Alternatively, the tangs 274, 276, 310a, 310b, 312a and 312b can be provided at predetermined locations along the height of the base walls 272 and 304 or do not need to extend the entire height of the base walls 272 and 304, provided, of course that they are capable of interengaging with each other. In addition, the tangs 274, 276, 310a, 310b, 312a and 312b can be reversed such that tangs 310a, 310b, 312a and 312b are provided instead on cap 260 and tangs 274 and 276 are provided instead on strip 262.

It is to be understood that the shape of the base wall 72 shown in the first and second embodiments can be used in the third and fourth embodiments, and the shape of the base wall 272 shown in the third and fourth embodiments can be used in the first and second embodiments.

In the embodiments of the joint construction 20, 20', 220 and 220', the end portion or surfaces 34, 34'; 48, 48'; 234, 234'; 248, 248' do not need to extend all of the way to the end of the panels. In this embodiment, the cap 60, 260 and/or the logistic strip 62, 262 would have a modified shape to accommodate this structure.

In the embodiments of the joint construction 20, 20', 220 and 220', the upper and lower ends of the cap 26, 26', 226 and 226' can be flat to allow for attachment to the upper and lower rails of the trailer 622. In all of the embodiments of the joint construction 20, 20', 220 and 220', the cap 26, 26', 226 and 226' can be planar along its height and width.

In the embodiments of the joint construction 20, 20', 220 and 220', the cavity 130, 130', 330, 330' can be eliminated, or substantially eliminated such that the tangs are close to our abut each other. The apertures 106, 306 may then be eliminated.

Figure 11:
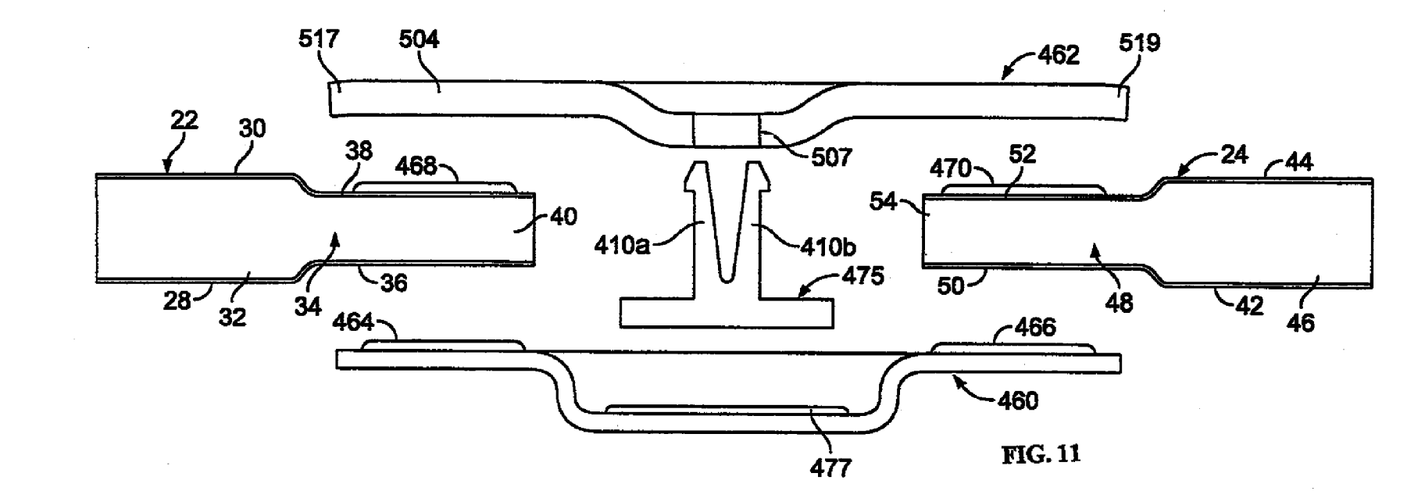
FIG. 11 is an exploded, cross-sectional view of the of the components shown in FIG. 9.

Attention is now invited to the fifth embodiment of the joint construction 420 shown in FIGS. 9-11. The joint construction 420 is formed of a plurality of composite panels, for example composite panels 22 and 24; each pair of composite panels 22 and 24 being joined together by a joint 426. The composite panels 22 and 24 are identically formed to that shown in the first embodiment. Therefore, the specifics of same are not repeated. For purposes of clarity, the structure of the joint 426 is described with respect to one of the joints 426 between these composite panels 22 and 24, with the understanding the other composite panels and the joints between such other composite panels which form the trailer components are the same.

The joint 426 is formed from a cap 460 and a strip 462 which have portions provided on opposite sides of the composite panels 22 and 24, which mate together between the composite panels 22 and 24, and which are bonded to the end portions 34 and 48 of the composite panels 22 and 24 by adhesive films or paste 464, 466, 468 and 470.

The cap 460 may be formed from metal or plastic and may be formed by molding, extruding or by other known means. As shown, the cap 460 is formed from two components, a base wall 472 and a tang portion 475 which are joined together by adhesive 477. Alternatively, the base wall 472 and tang portion 475 can be integrally formed as one piece.

The base wall 472 has a flat, solid center section 478 which is parallel to the composite panels 22 and 24, a first intermediate section 480 which is generally perpendicular to the center section 478, a first end section 482 which extends outwardly from the opposite end of the first intermediate section 478, a second intermediate section 484 which is generally perpendicular to the center section 478, and a second end section 486 which extends outwardly from the opposite end of the second intermediate section 484. The center section 478, the first end section 482 and the second end section 486 are parallel to each other and are parallel to the composite panels 22 and 24 when attached thereto as described herein. The first and second end sections 482 and 486 are co-planar and are offset from the center section 478. A plurality of striations (not shown) may be provided on an inner surface of the first end section 482 and a plurality of striations (not shown) may be provided on an inner surface of the second end section 486. The striations may be formed during extruding or molding, or are machined into the end sections 482 and 486. The striations are optional. The ends of the base wall 472 may be straight, as shown, or angled. The top end section 479 and the bottom end section 481 of the base wall 472 are flat. As a result, a recess 483 is formed in the cap 460.

The tang portion 475 is formed from a flat base wall 487 and a plurality of spaced apart pairs of one-sided tangs 410a and 410b. The one-sided tangs 410a and 410b face away from each other. Between each pair of tangs 410a and 410b, an aperture 489 is provided. An aperture 489 may also be provided above the topmost pair of tangs 410a and 410b and below the bottommost pair of tangs 410a and 410b. The base wall 487 sits within the recess 483 and is secured to the inner surface of the center section 478 by the adhesive 477. The one-sided tangs 410a and 410b extend outwardly from the base wall 487. Each tang 410a and 410b has a portion 418a and 418b which extends from the base wall 487 toward the cap 460. The portions 418a and 418b are perpendicular to the base wall 487. Each portion 418a and 418b has a length which is less than the thickness of the end sections 34, 48. A respective interlock, which in the preferred embodiment is barb 420a and 420b, is provided on the portions 418a and 418b and face away from each other. Each barb 420a and 420b has a beveled surface at its end.

The strip 462 may be formed from metal or plastic and may be formed by roll forming, molding, extruding or by other known means. The strip 462 is formed from a base wall 504 having a center section 508 which is parallel to the composite panels 22 and 24, a first intermediate section 509 which angles from the center section 508, a first end section 511 which extends outwardly from the opposite end of the first intermediate section 509, a second intermediate section 513 which angles from the center section 508, and a second end section 515 which extends outwardly from the opposite end of the second intermediate section 513. The center section 508, the first end section 511 and the second end section 515 are generally parallel to each other and are generally parallel to the composite panels 22 and 24 when attached thereto as described herein. The first and second end sections 511 and 515 are generally co-planar and are offset from the center section 508. A plurality of striations (not shown) may be provided on an inner surface of the first end section 511 and a plurality of striations (not shown) may be provided on an inner surface of the second end section 515. The striations may be formed during extruding or molding, or are machined into the end sections 511 and 515. The striations are optional.

End portions 517 and 519 of the base wall 504 may curve inwardly toward the cap 460. The ends of the base wall 504 may be straight, as shown, or angled. If angled, the ends of the base wall 504 retain adhesive as discussed herein and to accommodate variations in the thickness of the panels 22 and 24. The angle of the ends of the base wall 504 can be such that base wall 504 is longest at the surface proximate to the composite panel 22 and 24. Alternatively, the angle of the ends of the base wall 504 can be such that base wall 504 is shortest at the surface proximate to the composite panel 22 and 24.

A first set of spaced apart apertures 506 are provided through the center section 508 of the base wall 504. A second set of spaced apart apertures 507 are provided through the center section 508 of the base wall 504. The apertures 507 in the second set alternate with the apertures 506 in the first set along the height of the base wall 504. The apertures 506 form logistics apertures. The apertures 507 form an interlock on the strip 462. The apertures 507 are sized to accommodate the barbs 420a, 420b as they pass through.

To form the joint 426, the ends of the first and second panels 22, 24 are spaced apart from each other to form a gap therebetween. The cap 460 and the strip 462 are bonded by adhesive films or paste 464, 466, 468 and 470 to the surfaces of the end portions 34 and 48 and are mated together via the tangs 410a, 410b which pass into through gap and attach within the apertures 507. As a result, the end portions 34 and 48 are sandwiched between the cap 460 and the strip 462.

Adhesive films or paste 468 and 470 are formed on the surfaces of the end sections 38 and 52. The end sections 511 and 515 of the strip 462 are then seated against the surfaces of the end sections 38 and 52, thereby sandwiching the adhesive films or paste 468 and 470 between the strip 462 and the end portions 34 and 48. Alternatively, the adhesive films or paste 468 and 470 can be formed on the surfaces of the end sections 511 and 515 of the strip 462. Striations, if provided, on the end sections 511 and 515 ensure the thicknesses of the adhesive films or paste 468 and 470 for handling and the like when the strip 462 is seated against the surfaces of the end sections 34 and 48.

Adhesive films or paste 464 and 466 are formed on the surfaces of the end sections 482 and 486 of the cap 460. The end portions 482 and 486 of the cap 460 are then seated against the surfaces of the end sections 36 and 50, thereby sandwiching the adhesive films or paste 464 and 466 between the cap 460 and the end sections 36 and 50. Alternatively, the adhesive films or paste 464 and 466 can be formed on the surfaces of the end sections 36 and 50. The striations, if provided, ensure the thicknesses of the adhesive films or paste 464 and 466 for handling and the like when the cap 460 is seated against the surfaces of the end sections 34 and 48.

When the cap 460 is seated against the end portions 34 and 48 of the composite panels 22 and 24, the tangs 410a, 410b enter into the respective apertures 507 and flex to compress toward each other. Once the barbs 420a, 420b clear the aperture 507, the tangs 410a, 410b expand and the portions 418a, 418b bear against the wall surrounding the aperture 507. To effect this, a load is placed on the cap 460 and on the strip 462 to compress the end portions 40 and 54 of the core members 32 and 46, to an extent until the tangs 410a, 410b and respective apertures 507 interengage. When the load is removed, the end portions 40 and 54 of the core members 32 and 46 will expand to ensure a tight fit between the tangs 410a, 410b and respective apertures 507. Alternatively, a load does not need to he placed on the cap 460 and on the strip 462 and instead, the tangs 410a, 410b and apertures 507 are moved into interengagement. The mechanical connection of the tangs 410a, 410b and apertures 507 provide integral clamping for handling prior to curing of the adhesive films or paste 464, 466, 468 and 470, and provide inherent stiffness and clamp load during the curing cycle of the adhesive films or paste 464, 466, 468 and 470.

Because of this construction, the base wall 504 of the strip 462 is flush with the exposed surface of composite panels 22 and 24. In addition, the barbs 420a and 420b sit within a recess defined by the center section 508 and intermediate sections 509 and 513 so that the ends of the barbs 420a, 420b are flush or recessed from the exposed surface of composite panels 22 and 24. The end section 38 provides a well for any adhesive film or paste 468 that is squeezed out from between the strip 462 and the composite panel 22; the end section 52 provides a well for any adhesive film or paste 470 that is squeezed out from between the strip 462 and the composite panel 24. The end section 36 provides a well for any adhesive film or paste 464 that is squeezed out from between the cap 460 and the composite panel 22; the end section 50 provides a well for any adhesive film or paste 466 that is squeezed out from between the cap 460 and the composite panel 24.

This joint construction 420 provides a cavity 530 into which outside devices, such as cargo securement devices (not shown), can be passed via apertures 506. The cap 460 and the apertures 489 in the tang portion 475 provides a clearance relief for the outside devices. Preferably, in a refrigerated trailer, the cavity 530 is filled with foam to reduce heat transfer. If filled with foam, the apertures 506 are not provided.

While reduced end sections 34 and 48 are described, it is to be understood that the joint construction 420 can be formed without the reduced end sections 34 and 48 such that the first and second skins 28, 42; 30, 44 of the panels 22 and 24 would be planar. While reduced end sections 34 and 48 are shown and described, it is to be understood that the joint construction 420 can be formed with the reduced end sections 34 and 48 only having either the first or second skins 28, 42; 30, 44 having an offset end section (for example, only the first skins 28 and 42 have the offset end sections 36 and 50, and end sections 38 and 52 of the second skins 30 and 44 are planar with the remainder of the second skins 30 and 44). The cap 460 can be flat.

While this fifth embodiment is shown and described with respect to composite panels, it is to be understood that the panel can be formed from a single sheet or multiple sheets of metal, preferably steel and/or aluminum. If multiple sheets are used to form the panels, the sheets are secured together by suitable means, such as adhesive or by fasteners.

In all of the embodiments of the joint construction 20, 20', 220, 220' and 420, rivets are eliminated in the joint, thereby reducing snag points, increasing strength and reducing labor during assembly. As a result of the elimination of the rivets, a reduction in repetitive motion injuries from rivet insertion is provided and reduces ambient noise during manufacture. Moreover, the elimination of the rivets results in a more cosmetically appealing look to the trailer 622.

In all of the embodiments of the joint construction 20, 20', 220, 220' and 420, it is to be understood that the shape of the barbs shown are illustrative only, and other end shapes can be provided on the ends of the barbs to form the interlock.

While preferred embodiments of the present invention are shown and described, it is envisioned that those skilled in the art may devise various modifications of the present invention without departing from the spirit and scope of the appended claims.

The invention claimed is:

1. A wall or roof of a trailer comprising:
   a first panel, said first panel having an inner surface and an opposite outer surface;
   a second panel, said second panel having an inner surface and an opposite outer surface, ends of said first and second panels being spaced apart from each other to form a gap therebetween;
   a cap including a base wall, a first tang provided on said base wall, and second tang provided on said base wall, said base wall having opposite first and second end portions, each said end portion having a predetermined width, said first end portion being adjacent to said first panel, said second end portion being adjacent to said second panel, and a center portion being adjacent to said gap, said first and second end portions abutting against said outer surfaces of said first and second panels along the entire width of each said end portion; and
   a strip including a base wall, first tang provided on said base wall, and second tang provided on said base wall, said strip and said cap being separate members, said base wall of said strip having opposite first and second end portions, each said end portion of said strip having a predetermined width, said first end portion of said strip being adjacent to said first panel, said second end portion of said strip being adjacent to said second panel, and a center portion of said strip being adjacent to said gap, said first and second end portions of said strip abutting said inner surfaces of said first and second panels along the entire width of each said end portion of said strip, said first tang on said strip and said first tang on said cap interengage and are positioned within said gap, said second tang on said strip and said second tang on said cap interengage and are positioned within said gap, said center portion of said strip having a plurality of spaced apart apertures provided therethrough which are adjacent to said gap and between the interengaged first tangs and interengaged second tangs.

2. A wall or roof of a trailer as defined in claim 1, wherein said first and second panels are composite panels.

3. A wall or roof of a trailer as defined in claim 1, wherein said first and second panels are from a single sheet of metal.

4. A wall or roof of a trailer as defined in claim 1, further including an adhesive provided between said base wall of said cap and said outer surfaces, and an adhesive provided between said base wall of said strip and said inner surfaces.

5. A wall or roof of a trailer as defined in claim 4, further including a plurality of striations provided on said base wall of said strip, and a plurality of striations provided on said base wall of said cap.

6. A wall or roof of a trailer as defined in claim 4, wherein at least one of said cap and said strip has ends which are angled.

7. A wall or roof of a trailer as defined in claim 4, wherein said first and second panels are composite panels.

8. A wall or roof of a trailer as defined in claim 4, wherein said first and second panels are from a single sheet of metal.

9. A wall or roof of a trailer as defined in claim 1, wherein a portion of at least one of said first and second panels has a reduced thickness from a remainder of said first and second panels, portions of at least one of said base wall of said cap and said base wall of said strip abutting said reduced thickness portions.

10. A wall or roof of a trailer as defined in claim 9, wherein said first and second panels are composite panels.

11. A wall or roof of a trailer as defined in claim 9, wherein said first and second panels are from a single sheet of metal.

12. A wall or roof of a trailer as defined in claim 9, further including an adhesive provided between said base wall of said cap and said outer surfaces, and an adhesive provided between said base wall of said strip and said inner surfaces.

13. A wall or roof of a trailer as defined in claim 12, further including a plurality of striations provided on said base wall of said strip, and a plurality of striations provided on said base wall of said cap.

14. A wall or roof of a trailer as defined in claim 12, wherein at least one of said cap and said strip has ends which are angled.

15. A wall or roof of a trailer as defined in claim 1, wherein said tangs on said strip have one-sided barbs thereon and said tangs on said cap have one-sided barbs thereon.

16. A wall or roof of a trailer as defined in claim 15, wherein said one-sided barbs have beveled ends.

17. A wall or roof of a trailer as defined in claim 1, wherein said first and second panels are from multiple sheets of metal.

18. A wall or roof of a trailer as defined in claim 4, wherein said first and second panels are from multiple sheets of metal.

19. A wall or roof of a trailer as defined in claim 9, wherein said first and second panels are from multiple sheets of metal.

20. A wall or roof of a trailer as defined in claim 1, wherein at least one of said first tangs of said cap and strip has a double-sided barb thereon which engages with the first tangs on the other of said cap and strip.

21. A wall or roof of a trailer as defined in claim 1, wherein at least one of said first tangs on said strip and cap has a double-sided barb thereon which engages with the first tang on the other of said cap and strip.

22. A wall or roof of a trailer as defined in claim 21, wherein at least one of said second tangs on said strip and cap has a double-sided barb thereon which engages with the second tang on the other of said cap and strip.

* * * * *